United States Patent [19]

Schreiber et al.

[11] Patent Number: 5,010,405
[45] Date of Patent: Apr. 23, 1991

[54] RECEIVER-COMPATIBLE ENHANCED DEFINITION TELEVISION SYSTEM

[75] Inventors: William F. Schreiber, Cambridge; Andrew B. Lippman, Salem; Edward H. Adelson, Cambridge, all of Mass.; Arun N. Netravali, Westfield, N.J.

[73] Assignee: Massachusetts Institute of Technology, Cambridge, Mass.

[21] Appl. No.: 305,796

[22] Filed: Feb. 2, 1989

[51] Int. Cl.$^5$ .............................................. H04N 7/04
[52] U.S. Cl. ...................................... 358/141; 358/12
[58] Field of Search ...................... 358/11, 12, 15, 16, 358/133, 138, 140, 141

[56] References Cited

U.S. PATENT DOCUMENTS

4,287,528  9/1981  Levy ................................... 358/146
4,521,803  6/1985  Gittinger .............................. 358/12

FOREIGN PATENT DOCUMENTS

60-12883  1/1985  Japan .
505653    5/1939  United Kingdom .................. 358/15

OTHER PUBLICATIONS

P. P. Vaidyanathan, "Quadrature Mirror Filter Banks, M-Band Extensions and Perfect-Reconstruction Techniques", IEEE ASSP Magazine, Jul. 1987, pp. 4–20.
Lawrence Gilman Roberts, "Picture Coding Using Pseudo-Random Noise", IRA Transactions on Information Theory, Feb. 1962, pp. 145–154.
W. F. Schreiber et al., "Channel-Compatible 6-MHz HDTV Distribution Systems", SMPTE Nashville, Jan. 29, 1988.
W. F. Schreiber, "Reliable Television Transmission Through Analog Channels", U.S. patent application Ser. No. 257,402.
W. F. Schreiber, "Adaptive Frequency Modulation", U.S. patent application Ser. No. 061,450.
W. F. Schreiber, "Improved Definition Systems", U.S. patent application Ser. No. 149,673.
"Experiments on Proposed Extended-Definition TV with Full NTSC Compatibility", by Fukinuki et al., SMPTE Journal, Oct. 1984, pp. 923–929.

*Primary Examiner*—John W. Shepperd
*Assistant Examiner*—Michael D. Parker
*Attorney, Agent, or Firm*—Fish & Richardson

[57] ABSTRACT

A television encoder for generating a receiver-compatible signal from a production video signal containing enhancement information which cannot be displayed on a standard receiver, the receiver-compatible signal being compatible with the standard receiver, the encoder including a filter bank for dividing the video signal into at least two groups of spatial frequency components including a first group and a second group, the first group containing members which when combined together form a standard video signal which is displayed by the standard receiver and the second group containing the enhancement information; a quantizer for quantizing at least one member of the first group; a combiner for adding at least one member of the second group to a quantized member of the first group to produce a modified first group; and a synthesizer for combining the members of the modified first group to generate the receiver-compatible signal.

29 Claims, 4 Drawing Sheets

FIG.4 CLICK ELIMINATOR

RECEIVER-COMPATIBLE ENHANCED DEFINITION TELEVISION SYSTEM

BACKGROUND OF THE INVENTION

This invention relates to enhanced definition television (EDTV) systems.

Recent interest in producing high quality television images has generated many proposals for improved television systems. One of the better known examples of such a system is a high definition television (HDTV) developed by the Japanese. In comparison to the existing NTSC receivers, the Japanese HDTV offers better spatial resolution, a wider aspect ratio and it is free of other defects associated with NTSC systems.

For many in the broadcast industry, however, the Japanese HDTV has a major drawback. It is incompatible with the existing 160 million NTSC receivers. A commonly held view is that the early changes in television broadcast systems should be receiver-compatible, i.e., they should be compatible with the current NTSC receivers, so that broadcasters who adopt the new systems will be able to continue to serve the large number of NTSC receivers. Of course, the standard receiver would display a standard image and not an enhanced image. Responsive to this concern, some people have proposed that the industry start with an intermediate quality, enhanced definition (EDTV) system which is receiver-compatible and then move to a non-compatible system at a later stage. That is, the EDTV system would be a technological "bridge" from the current system to a final system. Ideally, the EDTV system would be compatible with both the current NTSC system and the final system so that consumers would not find themselves owning receivers that were incapable of receiving programming transmitted according to the final system's standards.

Generally, the broadcast industry agrees that the final system will have a wider aspect ratio than the NTSC system, probably more like the aspect ratio that is available in widescreen movies. Thus, instead of the 4×3 frame of the NTSC system, the final system would produce a 16×9 frame. The top and bottom regions of the NTSC frame, representing about 25% of the image area, will be unused in the final system.

One approach to achieving backward compatibility in the EDTV systems is to transmit the 16×9 frame using an NTSC signal and to usurp the "unused" portions of the 4×3 NTSC frame for transmitting image enhancement information for the EDTV receiver. The NTSC receiver displays only the NTSC signal and ignores the information in the enhancement signal. Thus, the image on the NTSC receiver is normal throughout the NTSC portion and is blank in the "unused" top and bottom portions. Although such a system would have the receiver-compatibility desired, the presence of the blank areas at the top and bottom of the screen is thought by some to be undesirable.

SUMMARY OF THE INVENTION

In general, in one aspect, the invention features a television system for converting a production video signal containing enhancement information which cannot be displayed on a standard receiver into a receiver-compatible signal which can be displayed on the standard receiver and which also carries the enhancement information so that it can be displayed on an enhanced definition television. The system includes an encoder for generating the receiver-compatible signal from the production signal by embedding the enhancement information into quantized lower frequency components of the production signal, the lower frequency components being the frequency components which are displayed on the standard receiver.

Preferred embodiments include the following features. The encoder includes a filter bank for dividing the video signal into at least two groups of spatial frequency components including a first group and a second group, the first group containing members which when combined together form a standard video signal which is displayed by the standard receiver and the second group containing the enhancement information. The encoder also includes a quantizer for quantizing members of the first group; a combiner for adding selected members of the second group to corresponding quantized members of the first group to produce a modified first group; and a synthesizer for combining the members of the modified first group to generate the receiver-compatible signal.

The invention also includes other features. For example, the encoder includes an adaptive modulation element for adaptively modulating members of the second group before such members are combined with the corresponding quantized members of the first group and it includes a scrambler for scrambling members of the second group before such members are combined with the corresponding quantized members of the first group. In addition, on successive frames of the image, the combiner in the encoder selects different members of the second group to be added to the corresponding quantized members of the first group. Thus, a greater number of members from the second group may be transmitted but at a lower frame rate than the frame rate of the standard receiver. Further, the combiner employs a reflected code to combine the selected members of the second group with corresponding quantized members of the first group. Also, the quantizer implements a non-uniform quantization function.

In general, in another aspect of the invention, the invention features an enhanced-definition television (EDTV) receiver for decoding a transmission signal in which enhancement information for video display was embedded in quantized lower frequency components. The EDTV receiver includes front end circuitry for receiving and demodulating the transmission signal to generate a received signal; a decoder for extracting the embedded enhancement information from the lower frequency components of the received signal and generating an EDTV video signal including the extracted enhancement information; and a video display section for displaying the enhancement information in the EDTV video signal.

Preferred embodiments include the following features. The decoder includes a filter bank for dividing the received signal into at least two groups of spatial frequency components including a first group and a second group, the second group containing members in which the enhancement information is embedded; a quantizer for quantizing members of the second group; a combiner for subtracting the quantized members from the corresponding non-quantized members of the second group to produce a third group including members containing the enhancement information; and a synthesizer for combining the members of the first group, the second group and the third group to generate the EDTV video signal for displaying the enhancement information on the EDTV system.

The invention also includes additional features. For example, the decoder includes an adaptive demodulation element for adaptively demodulating members of the third group before such members are combined by the decoder's synthesizer with members of the first group and quantized members of the second group. And, the decoder includes a descrambler for unscrambling members of the third group before such members are combined by the decoder's synthesizer with members of the first group and quantized members of the second group. In addition, the decoder's combiner employs a reflected code to decipher differences between the quantized members and the corresponding unquantized members of the second group. Also, the decoder's quantizer implements a non-uniform quantization function. Further, the decoder includes a channel quality monitor for measuring the quality of the receiver-compatible signal and comparing the measured quality to a preselected threshold, wherein the quality monitor causes the decoder's synthesizer to exclude certain members of the third group when combining members of the groups to generate the EDTV signal.

The invention generates a receiver-compatible signal which can be displayed on a standard receiver (e.g. an NTSC receiver) and which also carries enhancement information that can be displayed on another receiver equipped to extract and utilize the information. Although, the enhancement information cannot be displayed on the standard receiver, its presence in the receiver-compatible signal does not perceptibly degrade the quality of the image available on the standard receiver. Indeed, for the most part the viewer of the standard receiver should not be aware that enhancement information is present on the signal.

The invention also has the advantage of being able to add more enhancement information to the receiver-compatible signal than is possible using previously available methods.

Other advantages and features will become apparent from the following description of the preferred embodiment, and from the claims.

DESCRIPTION OF THE PREFERRED EMBODIMENT

Figure 1:
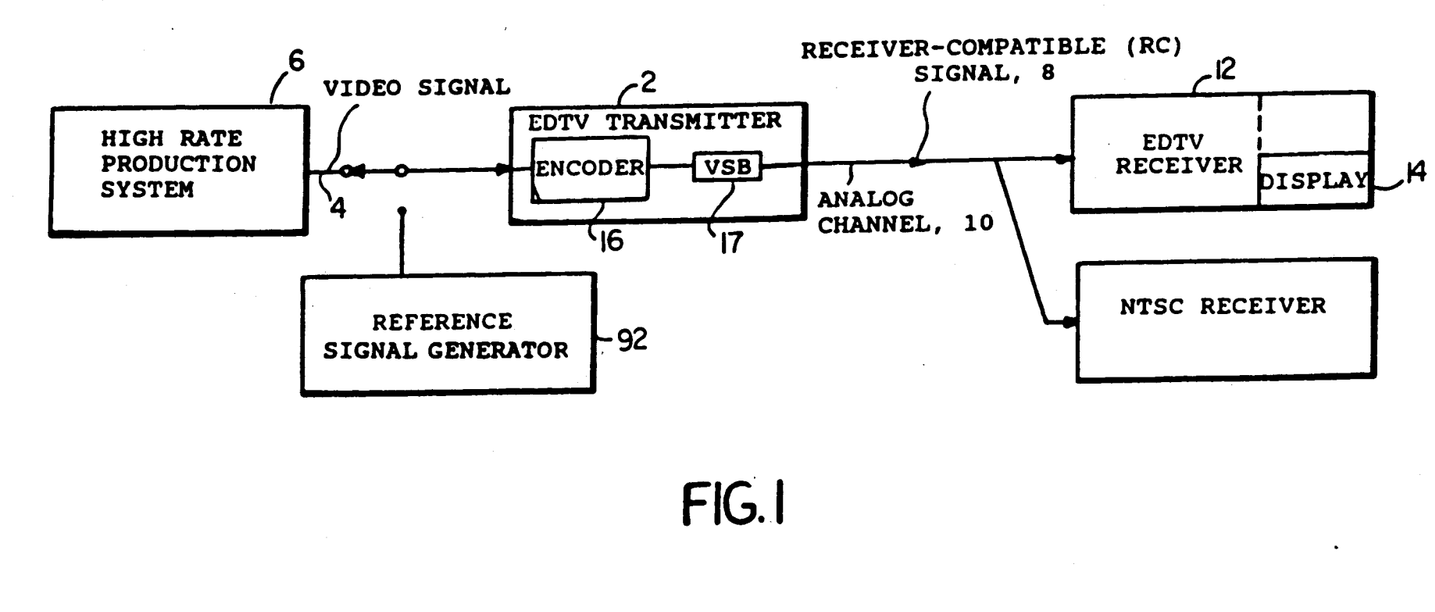
FIG. 1 is a block diagram of a system which embodies the invention.

As illustrated in FIG. 1, the invention includes an enhanced definition (EDTV) transmitter 2 which converts a video signal 4 from a high rate production system 6 into a receiver-compatible (RC) signal 8 that is sent over an analog channel 10 to an EDTV receiver 12. The EDTV receiver 12 demodulates the received RC signal 8 and displays it on a display 14. The same signal can also be decoded and displayed on a standard NTSC receiver.

Figure 2:
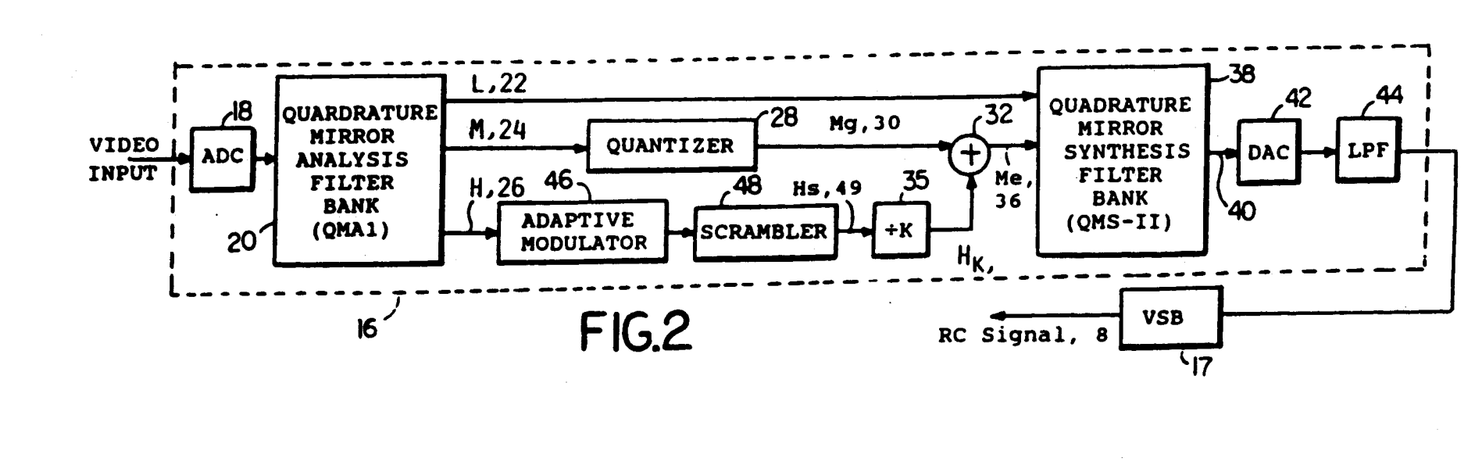
FIG. 2 is a block diagram of the encoder depicted in FIG. 1.

EDTV transmitter 2 includes an encoder 16, which is illustrated in FIG. 2. In encoder 16, an analog-to-digital converter 18 receives the video signal and converts it into a digital form which is then passed to a filter bank (QMA-I) 20. QMA-I 20 divides the digital video signal into three digital data streams, namely, an L component 22, representing a low frequency range; an M component 24, representing a middle frequency range; and an H component 26, representing a high frequency range. The L and M components 22 and 24 contain the video information normally transmitted in an NTSC signal, whereas the H component 26 contains enhancement information available from the high rate production system 6, shown in FIG. 1.

QMA-I 20 is preferably a quadrature-mirror analysis filter bank such as that described by P. P. Vaidyanathan in "Quadrature Mirror Filter Banks, M-Band Extensions and Perfect-Reconstruction Techniques," *IEEE ASSP Magazine*, July, 1987, incorporated herein by reference. In general terms, a quadrature-mirror analysis filter divides the frequency spectrum of an input signal into n different regions and decimates the signal associated with each of the regions by a factor of n thereby producing n different digital data streams, each effectively located at baseband. In the illustrative example shown in FIG. 1 and described below, n is equal to three and the frequency spectrum is one-dimensional. Of course, as will also be described later, it may be desirable to operate in the two-dimensional spatial-frequency space and select an n which is larger than three. That is, QMA-I 20 would produce more than three different digital data streams, each of which corresponded to a different two-dimensional region within the spatial-frequency spectrum.

Encoder 16 inserts or embeds the enhancement information into a quantized version of the middle frequency signal. The process of embedding the enhancement information into a quantized signal shall be referred to as the "noise margin" method. In accordance with the "noise margin" method, a quantizer 28 quantizes the M component 24 using an m-level quantization function to generate a quantized $M_Q$ signal 30 which is sent to a combiner 32. Another section of encoder 16, to be described shortly, processes the H component 26 to generate an H. signal 34 which is also sent to combiner 32 where it is added to the $M_Q$ signal 30 to produce an enhanced $M_E$ signal 36. The $M_Q$ signal 30 is referred to as the "under" signal and the $H_K$ signal 34 is referred to as the "over" signal.

Encoder 16 includes a divider 35 which scales down the amplitude of the $H_K$ signal 34 so that its maximum amplitude plus the amplitude of expected noise on channel 10 is less than the minimum separation between quantization levels of the $M_Q$ signal 30. To this end, divider 35 divides the H component 26 by a factor k, which is preferably greater than the number of quantization levels, m, thereby assuring that the addition of the $H_K$ signal 34 to the quantized $M_Q$ signal 30 does not corrupt the information present in the $M_Q$ signal 30. In effect, by quantizing the M component 24, quantizer 28 generates signal-to-noise ratio (SNR) headroom in the $M_Q$ signal 30 in the form of the separations between quantization levels. Eecoder 16 uses the SNR headroom to carry the information contained in the H component 26. Thus, the enhancement information present in the H component 26 is embedded in the $M_Q$ signal 30 of the NTSC signal in such a way as to be imperceptible on the NTSC receiver but separable by an EDTV decoder.

The $M_E$ signal 36 and the L component 22 of the original signal are then passed through a synthesis filter (QMS-II) 38, which reconstructs a single output signal 40 from them. QMS-II 38 is preferably a quadrature-mirror synthesis filter bank such as is described by the Vaidyanathan reference cited above. In other words, it is an interpolator which reverses the operations performed by the decimator in QMA-I 20.

Prior to transmission over analog channel 10, the output signal 40 is converted to analog form by a digital-to-analog converter (DAC) 42 and filtered by a low pass filter (LPF) 44. Finally, transmitter 16 includes a vestigial side band (VSB) modulator 17 which employs standard NTSC modulation techniques to generate RC signal 8. Since standard NTSC modulation techniques are used, the generated RC signal 8 is, of course, receiver-compatible and may be received and displayed on a standard NTSC receiver even though it contains the embedded enhancement information which the NTSC receiver does not "see" and cannot process. Moreover, an EDTV receiver, which is equipped to decode the enhancement information, can display a higher quality EDTV image.

The portion of encoder 16 which produces the $H_K$ signal 34 also includes an adaptive modulator 46, which adaptively modulates the H component 26, and a scrambler 48, which generates a scrambled high frequency component, $H_S$ 49. In effect scrambler 48 scrambles the H component 26 so that the H component 26 signal corresponding to one pel is added to an $M_Q$ signal 36 corresponding to a different pel. When used separately, each of these operations improves the quality of the EDTV image without degrading the NTSC image. When used together, the quality of the EDTV image which the RC signal 8 is capable of transmitting is astonishingly good. Each operation will now be described in greater detail.

Adaptive modulator 32 boosts the amplitude of the H components 26 so that they more efficiently utilize the bandwidth available for the enhancement information. It is preferable that their levels be made as high as possible without channel overload. See W. F. Schreiber et al., "Channel-Compatible 6-MHz HDTV Distribution System," presented at SMPTE Conference, Nashville, Jan. 29, 1988, incorporated herein by reference.

Various different methods may be used to adaptively modulate the H component 26. Some of the possible methods are described in the Schreiber et al. reference cited above as well as in a copending U. S. patent application, Ser. No. 61,140 entitled "Adaptive Frequency Modulation", filed June 10, 1987, now issued as U.S. Pat. No. 4,907,000 also incorporated herein by reference. In accordance with one method, x, y signal space is divided into blocks, e.g., 4×4 pels in size. Within each block, an adaptation factor is computed and transmitted to the receiver. At both transmitter and receiver, the factor actually used at each pel is found from the block factors by interpolation, so that the factor used varies smoothly from pel to pel, thus avoiding block artifacts.

Regardless of the method used, however, the factor used to boost the H component 26 will be large in the areas of the image which are relatively uniform or which lack detail. In such areas, the high frequency components of the image signal are, of course, very small and, without adaptive modulation, would occupy only a small portion of the available channel capacity. When adaptive modulation is used, the signals are increased in amplitude and placed within the SNR headroom available in the quantized $M_Q$ signal 30 where they more fully utilize the available channel capacity. The EDTV receiver, which is described below, decodes the amplitude modulated H components, thereby reducing them to their original amplitude. In doing so, the EDTV receiver also reduces the noise which was added to the transmitted signal in the channel and thus, significantly improves the SNR of the decoded H component at the receiver. The improvement in SNR is greatest in the areas of the image which are relatively uniform or lack detail, that is, the areas of the image in which noise would be most noticeable.

A code specifying the adaptive modulation factor used for each part of the image is also generated and transmitted to the EDTV receiver along with the image information. The EDTV receiver uses the code to decode the adaptively modulated portion of the received signal. One way of transmitting the code to the EDTV receiver is to time multiplex it with the image signal by, for example, sending it during the vertical retrace or blanking period prior to the transmission of each new line of image information.

Scrambler 48 further improves the quality of the EDTV image by dispersing any echoes and the linear frequency distortion associated with the analog channel throughout the image thereby making such distortions far less perceptible to the viewer. Scrambling of the H signal 26 by moving most of the large amplitude H signal samples into the blank areas of the M signal 24 reduces interaction between two signals that otherwise would be caused by the aforesaid echoes and frequency distortion. Use of a scrambler 48, of course, implies that the image, or at least a portion of it, is temporarily stored in transmitter 16 as a data array in which the array locations correspond to pels in the image. The scrambling function is then performed on the image data as it is read out of the array for transmission. A more detailed description of a system which implements a scrambling function is described in copending U.S. Patent Application Ser. No. 257,402 entitled "Reliable Television Transmission Through Analog Channels", filed Oct. 13, 1988, incorporated herein by reference.

Figure 3:
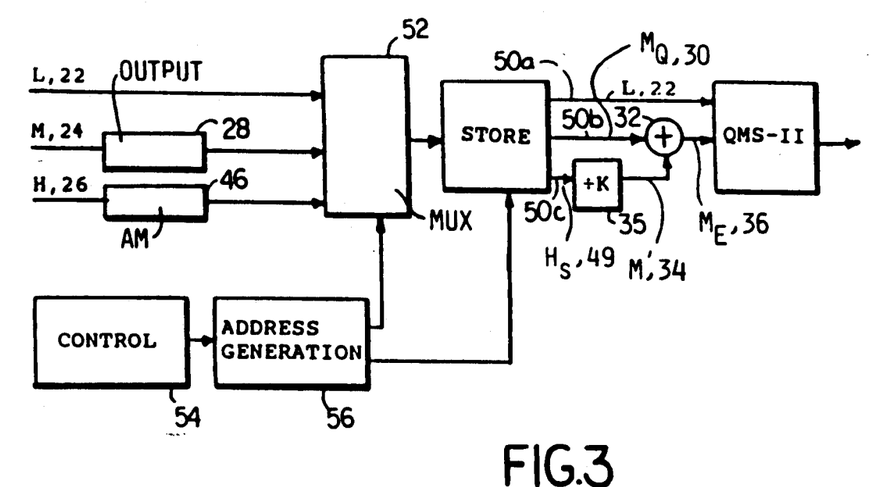
FIG. 3 is a block diagram more explicitly illustrating encoder subsystems which perform the function of the scrambler depicted in FIG. 2.

FIG. 3 depicts the encoder subsystems which implement the functions of scrambler 48. The data streams associated with the L component 22, the $M_Q$ signal 30, and the output of the adaptive modulator 46 are entered into a store 50 via a multiplexer 52. Store 50 is of sufficient size to hold one frame of information. A control unit 54 and an address generator 56 determine which data stream multiplexer 52 selects and which locations within store 50 are to receive the data from the selected data stream. All of the samples to be used in one frame must be stored and read out for transmission within one frame duration.

After a frame of information has been entered into store 50, address generator 54 generates a sequence which determines the order in which the stored data is read out in parallel over output lines 50a, 50b and 50c. The data read out over lines 50a, 50b and 50c correspond to the L component 22, the $M_Q$ signal 30 and the scrambled high frequency component, $H_S$ 49, respectively. Scrambling of the data is achieved by generating a suitable sequence of addresses in address generator 56 during the readout process. A pseudorandom rather than truly random process is desired, since the sequence of addresses must be known so that the receiver can properly decode the scrambled information. Well known techniques may be used for this purpose.

For minimum visibility of the noise and for encryption purposes, it is desirable that the random sequences used on successive frames be selected arbitrarily from a large repertory of possible sequences. Since each sequence can be characterized by a very short generating function, L. G. Roberts, "Picture Coding Using Pseudorandom Noise," *IRE Trans. on Information Theory*, Vol. 8, No. 2, Feb. 1962, pp. 145–154, all that is required to accomplish this is to label each sequence with a number, to store a table of numbers and corresponding generating functions for the sequences at both the encoder 16 and the decoder within the receiver, and to transmit in the data channel, for each frame, the number designating which generating function is used. Alternatively, the randomized starting address of a single random sequence can be stored in the table.

Figure 4:
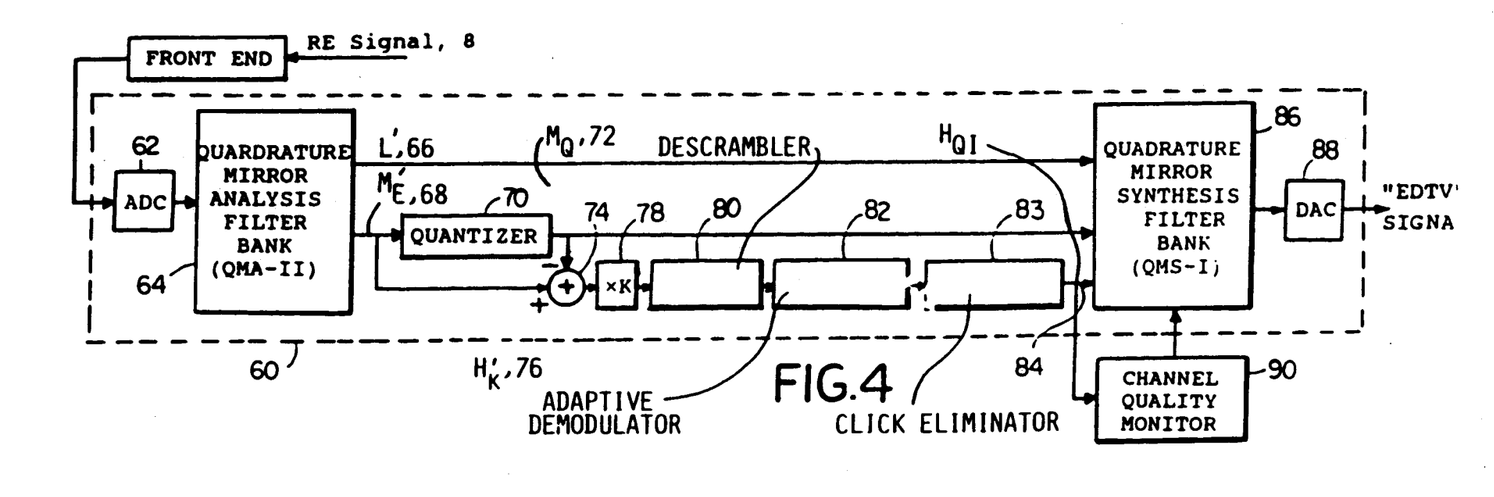
FIG. 4 is a block diagram of a decoder which is part of the receiver depicted in FIG. 1.

To decode the added enhancement information carried by RC signal 8, EDTV receiver 12, shown in FIG. 1, includes a decoder 60, which is illustrated in FIG. 4. The received RC signal 8 is processed by a front end within the receiver after which it goes to decoder 60 which performs the inverse of the operations that were performed in encoder 16, which generated the RC signal 8.

In decoder 60, an analog-to-digital converter (ADC) 62 converts the received signal into digital form and sends it to an analysis filter bank (QMA-II) 64. QMA-II 64 is the inverse of QMS-II 38 used in encoder 16 (See FIG. 2). That is, QMA-II 64 converts its input signal into two digital data streams, namely, an L' component 66 and an $M'_E$ signal 68, which are substantially equal to the corresponding inputs of QMS-II 38 in encoder 16. To separate the enhancement information from the received signal, a quantizer 70, using the same quantization function employed by quantizer 38 in encoder 16, quantizes $M'_E$ 68 to generate a quantized signal $M'_Q$ 72. Then, a summer 74 subtracts $M'_Q$ 72 from $M'_E$ 68 to produce a signal $H'_K$ 76 containing only the high frequency information. $H'_k$ then goes to a multiplier 78, which multiplies the signal by a factor of k, a descrambler 80, which unscrambles the signal using a sequence corresponding to the sequence used by encoder 16, and an adaptive demodulator 82, which adaptively demodulates the signal. The output of this series of operations is an $H_{est}$ signal 84 which is an approximation of the corresponding $H_K$ signal 34 in encoder 16.

The three signals L' 66, $M'_Q$ 72 and $H_{est}$ 84 are then input to a synthesis filter bank (QMS-I) 86, which is the inverse of QMA-I 20 found in encoder 16, to produce an approximation of the digital video signal. The output of QMS-I 86 is passed through a digital-to-analog convert (DAC) 88 to produce an analog video signal with the same bandwidth of and corresponding to the original video input. The analog video signal is used to produce an enhanced image on EDTV display 14, shown in FIG. 1.

Figure 5:
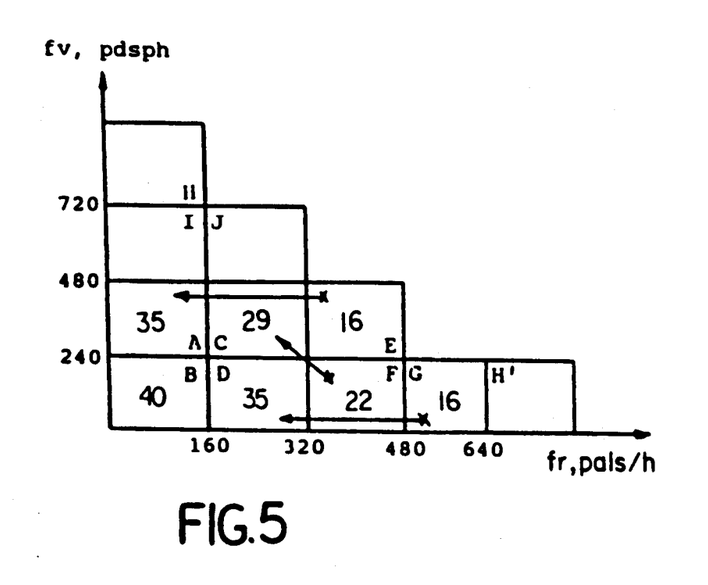
FIG. 5 is a diagram of two-dimensional spatial frequency space.

In the above-described embodiment, encoder 16 and decoder 60 may operate only to improve the horizontal resolution of the video image. In such a system, if the widths of the low, middle and high frequency ranges are each 1.5 MHz, for example, then the "NTSC" signal has a bandwidth of 3 MHz and the "EDTV" signal has a bandwidth of 4.5 MHz; thus, system enhances the horizontal resolution of the transmitted video signal by about 50%. In the preferred embodiment, however, subband coding such as that described in copending U.S. Patent Application Ser. No. 149,673 entitled "Improved Definition Television Systems", filed on Jan. 1, 1988, and incorporated herein by reference, is used. Thus, for example, the analysis filter QMA-I 20 is a two-dimensional filter which operates in the spatial frequency space of the video signal to generate many frequency components, each corresponding to a different region of the spatial frequency space. Preferably, QMA-I 20 is a two-dimensional quadrature-mirror filter bank which divides the spatial frequency space into at least the rectangular blocks shown in FIG. 5. In FIG. 5, the $f_v$ axis represents the vertical frequency spectrum of the image in pels per height and the $f_h$ axis represents the horizontal frequency spectrum of the image in pels per width. Such a filter is separable, meaning that the two-dimensional filter bank can be implemented as a cascade of one-dimensional quadrature-mirror filters, which are less expensive than two-dimensional nonseparable filters.

The quadrature-mirror analysis filter bank corresponding to QMA-I 20 of FIG. 2 divides the video input signal into seven components, namely, a low frequency component represented by block B; three middle frequency components represented by blocks A, C, and D; and three high frequency components represented by blocks E through G. The size of the blocks are selected so that block B contains the spatial lows of an NTSC signal, blocks A, C, and D contain the spatial highs of an NTSC signal, and blocks E through G contain horizontal enhancement information.

Using the "noise margin" method described above, encoder 16 inserts the enhancement information into quantized versions of the NTSC signal components which represent the spatial highs. In particular, the encoder inserts the enhancement information from block G into block D, from block F into block C and from block E into block A, as indicated by the arrows in FIG. 5. To establish the quantization levels, the digital samples associated with blocks A and D are digitized to 4 bits/sample and the digital samples associated with block C are digitized to 3 bits/sample. The enhancement components are reduced by factors corresponding to the 8-level and the 16 level quantized signals into which they will be inserted and are then added to their corresponding "under" signals. After the enhancement components have been inserted into the spatial highs, the resulting signals are recombined for transmission by using the appropriate quadrature-mirror synthesis filter bank corresponding to QMS-II 38 of FIG. 2.

If the channel-to-noise ratio (CNR) of the channel is high enough, the signal-to-noise ratio (SNR) of the "under" signal will be determined by the number of quantization levels. In general, the SNR (i.e. the ratio of the peak signal to rms (root-mean-square) quantization noise, in db) of the "under" signal is $10.8 + 6$ n, where n is the number of bits per sample and the SNR available for the "over" signal is about equal to CNR $-6$ n. Thus, with a CNR of 40 db, which represents a good but far from perfect transmission channel, and using the 3 and 4 bit digitization described above, the resulting SNR's for the different signal components are as follows. Using 4 bits per sample, the SNR of the "under" signal is 35 db and the SNR of the "over" signal is 16 db. Using 3 bits per sample, the SNR of the "under" signal becomes 29 db and the SNR of the "over" signal becomes 22 db. The corresponding SNR's for the signal components are shown in FIG. 5.

Of course, higher degrees of quantization may be used, but experience indicates that the 8-level and 16-level quantization selected yield good image quality on an NTSC receiver. In addition, since enhancement information is inserted only into the spatial highs of the NTSC signal, any added noise in the displayed image which may be due to the inserted signal is high-frequency noise that appears only near the edges and boundaries within the image where it is difficult to perceive.

Figure 6A:
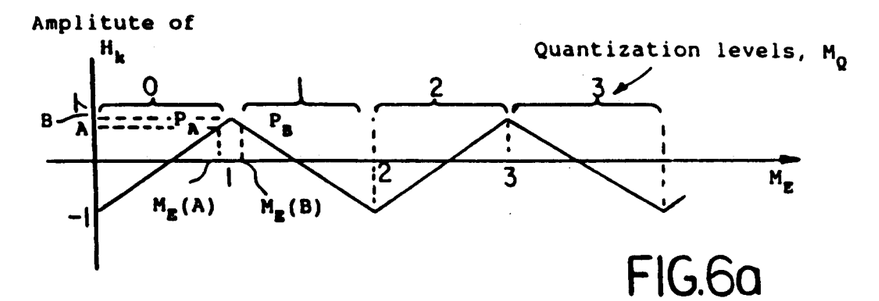
FIG. 6a-b illustrate a reflected code and a nonreflected code, respectively.

In accordance with another feature of the invention, combiner 32 in FIG. 2 implements a reflected code to insert the $H_K$ signal 34 into the quantized $M_Q$ signal 30. The operation of the reflected code can be more easily understood by referring to FIG. 6a, which displays an example of a reflected code. The curve in FIG. 6a depicts a functional relationship, $M_E = f(M_Q, H_K)$, according to which the combiner 32 generates $M_E$. In the figure, the y-axis represents the amplitude of the $H_K$ signal 34, and the bracketed regions represent the quantization levels of the $M_Q$ signal 30. In general, within each quantization level, combiner 32 either adds or subtracts (depending upon whether the range is odd or even) the $H_K$ signal 34 to arrive at the $M_E$ signal 36.

The advantage of using such a scheme is that it provides significant protection against channel noise causing impulse noise or "clicks" in the "over" signal. To appreciate how the reflected code system works to achieve this advantage, it is helpful to compare a system using a reflected code combiner with a system which uses a conventional combiner, i.e., a combiner 32 which simply adds the "over" signal to the "under" signal.

Figure 6B:
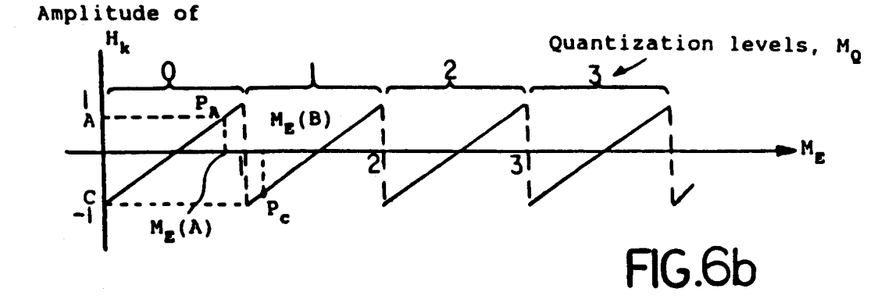

FIG. 6b helps illustrate how "clicks" occur when a conventional combiner is used. If the quantization level of the "under" signal is zero and the amplitude of the "over" signal is "A", then combiner 32 generates $M_E(A)$ as its output. When there is no channel noise, the EDTV receiver correctly determines the amplitudes of the transmitted "over" and "under" signals. However, when channel noise is present, the receiver may incorrectly determine the amplitude of one or both of the signals. Instead of receiving $M_E(A)$, the receiver may receive $M_E(B)$, which is slightly higher than $M_E(A)$. If "A" was close to the maximum amplitude of the "over" signal, then $M_E(B)$ may lie in the region of the next quantization level, as shown in the figure. When this happens, the receiver decodes the "under" signal as having quantization level one and it decodes the "over" signal as having amplitude "C". Thus, the receiver makes two errors, namely, a one quantization level error in the "under" signal, and a far more significant, large error in the "over" signal. Typically, the large error appears as an impulse in the "over" signal which is referred to as a "click".

As can be readily seen in FIG. 6a, channel noise will not produce such large errors in the "over" signal when combiner 32 implements a reflected code. If the EDTV receiver receives $M_E(B)$ instead of $M_E(A)$, it will, as before, produce a one-level error on the "under" signal, but it will not produce a large error in estimating the transmitted "over" signal. Instead of estimating the amplitude to be "A", the receiver will estimate it to be "B", very close to the actual amplitude.

An alternative method of removing the impulse noise or "clicks" is by using a click eliminator 83 which processes the signal output of adaptive demodulator 82 in decoder 60. (See FIG. 3.) Click eliminators are known to those skilled in the art. In general, click eliminator 83 compares the signal corresponding to a given pel with the average of the signals for neighboring pels. If the signal for the given pel exceeds the average of the neighboring signals by more than a preselected threshold, then click eliminator 83 replaces the signal for the given pel with the average of the neighboring signals.

In encoder 16 as so far described, the enhancement components are transmitted at the same rate as the components comprising the NTSC signal. A higher spatial resolution is achieved by transmitting a larger number of enhancement components at a lower temporal resolution, thus producing a generally higher overall quality. This is done by temporally prefiltering the enhancement components and then subsampling them in the time domain. For example, if the filtered components are subsampled at one-half the normal rate, twice as many enhancement components can be transmitted by combining two such components, on alternate frames, with a single NTSC component. At receiver 12, each such half-rate decoded enhancement component is temporally interpolated up to the full frame rate before combining it with the other components to produce the final EDTV signal.

Referring to FIG. 5, this is implemented by having the filter bank QMA-I 20 separate out components H, I, and J, in addition to the afore-mentioned E, F, and G components. I and F, after prefiltering, can then be alternately combined with C; H and G alternately combined with D; and J and E alternately combined with A. Of course, other combinations are also possible.

The arrangement just described results in a higher vertical resolution than the horizontal resolution in the EDTV image, particularly if the wide aspect ratio is used. To achieve a better balance, it is possible, for example, to use component H' rather than H. It is also possible to retain the full temporal resolution for one or more lower spatial frequency components while having lower temporal resolution for higher spatial frequency components. Many such combinations would be obvious to those skilled in the art and are within the scope of this invention.

It is possible for the enhancement information to become so corrupted during transmission that if it is used to generate an image on the EDTV receiver, the image will be of lower quality than the image available on an NTSC receiver. This would happen if the channel signal-to-noise ratio (CNR) deteriorates to a level at which the channel cannot reliably transmit the enhancement information. To prevent the resulting deterioration in the EDTV image, the EDTV receiver includes a channel quality monitor 90, as shown in FIG. 4. Channel quality monitor 90, in effect, measures the signal-to-noise ratio of the enhancement signal, $H_{est}$ 84. If the measured signal-to-noise ratio is less than a preselected value, indicating that the channel is too noisy to reliably transmit the enhancement information, monitor 90 causes QMS-I 86 to ignore the $H_{est}$ signal 84 when synthesizing the EDTV signal. The resulting EDTV signal in the low CNR situation contains only the low frequency and the middle frequency information, i.e. only the information transmitted by an NTSC signal.

The measurement of signal-to noise ratio is performed using a reference video signal which is generated by a reference signal generator 92 located at the transmitter 2. See FIG. 1. During periods when the reference signal is being transmitted, the signal received by EDTV receiver 12 includes the transmitted reference signal as well as noise and other impairments associated with channel 10. Channel quality monitor 90 within EDTV receiver 12 measures the quality of channel 10 by comparing the received signal, in particular, the high frequency components of it, to the known reference signal. The noise causes discrepancies between the received signal and the reference signal. The discrepancies between the two signals yield a measure of the signal-to-noise ratio which channel quality monitor 90 uses to determine when QMS-I 86 ignores the enhancement information.

Of course, it should be readily apparent that channel quality monitor 90 can operate on a component by component basis. That is, if the encoder utilizes more than one component of enhancement information, channel quality monitor 90 can individually test each component of enhancement information and reject only those components which have been corrupted by noise, retaining the non-corrupted components for producing the EDTV image.

Figure 7:
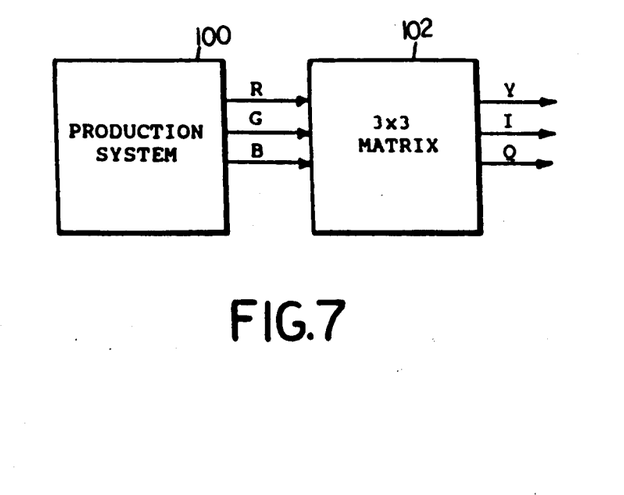
FIG. 7 illustrates a system for generating the luminance and chrominance signals.

In a system which transmits color information, the production signal is, of course, first divided into the chrominance and luminance signals used by NTSC systems. That is, referring to FIG. 7, a color production system 100 produces red, green and blue color information signals, identified by R, G, and B, respectively, which are then sent to a 3×3 matrix 102 where they are converted into a luminance signal, Y, and two components representing the chrominance signal, namely, I and Q. For NTSC signals and using one-dimensional filters, the horizontal resolution of the luminance is about 320 pels/picture width and its vertical resolution is about 480 pels/picture height; whereas, the horizontal resolution of the chrominance is about 65 pels/picture width and its vertical resolution is about 480 pels/picture height. This choice of horizontal resolution of chrominance and luminance results in non-overlap of the luminance spectrum in the frequency band of the color subcarrier and its sidebands. Thus, in the RC signal, the band of 0 to 3 MHz is free of crosstalk. Of course, with more complicated filtering, one could achieve higher resolution.

The "noise margin" method as described above can be used most productively on the luminance signal where the greatest amount of enhancement information may be embedded. Since the vertical resolution of the chrominance signal is much greater than is necessary or useful on an NTSC receiver, it may, however, also be desirable to embed enhancement information in the chrominance signal by some method, including using the "noise margin" method.

OTHER EMBODIMENTS

Other embodiments of the invention are within the following claims. For example, the quantizer 28 shown in FIG. 2 (and, of course, its counterpart in the decoder 60 shown in FIG. 4) can use a non-uniform quantization function. One such function employs what is referred to as "coring" according to which the high frequency components of the NTSC signal that are below a preselected threshold are set to zero. Since the high frequency components of the NTSC signal are generally of low amplitude in the blank areas, coring has the effect of improving the noise immunity of the video signal.

Another modification is to use a pseudorandom quantization function which employs the Roberts, method, which is described by L. G. Roberts, in "Picture Coding Using Pseudorandom Noise," IRE Trans. on Information Theory, Vol. 8, No. 2, Feb. 1962, pp.145-154.

According to the Roberts' method, pseudorandom noise (i.e. a known noise signal) is added to the signal prior to its being quantized in the encoder and then later, in the decoder, the pseudorandom noise is subtracted from the signal. In the EDTV receiver, this method has the effect of randomizing the quantization noise in the vicinity of sharp edges within the image. Without using this technique, such actual noise would appear as a series of closely spaced contours parallel to the edges. Since the NTSC receiver can not remove the pseudorandom noise, however, on NTSC receivers, the contours would appear to be spatially dithered rather than eliminated.

Although the above description relates primarily to using the "noise margin" method to embed enhancement information into an NTSC signal, it should also be understood that the complete EDTV system can incorporate other signal processing techniques which have been and are being developed for enhanced definition television systems. For example, since the chrominance signal of NTSC systems has excess vertical and temporal resolution, such techniques as temporal subsampling and interleaving may be employed to usurp the excess bandwidth for carrying additional information such as other video enhancement information or digital audio.

In accordance with subsampling, the chrominance signal is sampled at one half the NTSC frame rate and the subsampled value is sent for two successive frames. Then, in accordance with temporal interleaving, the additional information is added on top of the subsampled chrominance signal, alternating its polarity on each successive scan line, i.e. in counterphase. The resulting signal, when displayed on an NTSC receiver, will have a 15 f.p.s. chrominance flicker that will not be detectable by the viewer. In the EDTV receiver, the subsampled chrominance signal can be extracted by adding the chrominance signals from two successive frames, thereby cancelling the counterphase information. And the counterphase information can be extracted by subtracting the chrominance signal for two successive lines, thereby cancelling the subsampled chrominance information. Standard interpolation can be used to generate the required frame rate for the extracted signals.

What is claimed is:

1. A television encoder for generating a receiver-compatible signal from a production video signal containing enhancement information which cannot be displayed on a standard receiver, the receiver-compatible signal being compatible with the standard receiver, the encoder comprising:
    a. a filter bank for dividing the video signal into at least two groups of spatial frequency components including a first group and a second group, the first group containing members which when combined together form a standard video signal which is displayed by the standard receiver and the second group containing the enhancement information;
    b. a quantizer for quantizing at least one member of the first group;
    c. a combiner for adding at least one member of the second group to a quantized member of the first group to produce a modified first group; and
    d. a synthesizer for combining the members of the modified first group to generate the receiver-compatible signal.

2. A television encoder as defined in claim 1 wherein the standard receiver is an NTSC receiver.

3. A television encoder as defined in claim 1 wherein the first group comprises at least one low spatial frequency component and at least one middle spatial frequency component and wherein the quantizer operates only on the middle spatial frequency components.

4. A television encoder as defined in claim 3 wherein the filter bank is a two-dimensional filter bank which operates on the horizontal-vertical spatial frequency spectrum of the video signal and members of the first and second groups correspond to different two dimensional regions within the spatial frequency spectrum.

5. A television encoder as defined in claim 4 wherein the different regions within the spatial frequency spectrum are rectangular blocks and both the two-dimensional filter bank and the synthesizer element are separable filters.

6. A television encoder as defined in claim 3 wherein the filter bank comprises a quadrature-mirror analysis filter bank and the synthesizer element comprises a quadrature-mirror synthesis filter bank.

7. A television encoder as defined in claim 3 wherein the quantizer implements a non-uniform quantization function.

8. A television encoder as defined in claim 3 wherein the quantizer implements a pseudorandom quantization function.

9. A television encoder as defined in claim 3 further comprising an adaptive modulation element for adaptively modulating members of the second group before such members are combined with the corresponding quantized members of the first group.

10. A television encoder as defined in claim 3 further comprising a scrambler for scrambling members of the second group before such members are combined with the corresponding quantized members of the first group.

11. A television encoder as defined in claim 3 further comprising:
  a. an adaptive modulation element for adaptively modulating members of the second group before such members are combined with the corresponding quantized members of the first group; and
  b. a scrambler for scrambling members of the second group before such members are combined with the corresponding quantized members of the first group.

12. A television encoder as defined in claim 3 wherein the combiner employs a reflected code to combine the selected members of the second group to corresponding quantized members of the first group.

13. A television encoder as defined in claim 3 wherein the standard receiver operates at a preselected frame rate and wherein the identity of the selected members of the second group which are added to the corresponding quantized members of the first group changes from frame to frame so that the total enhancement information which is transmitted is sent at a lower frame rate than the preselected frame rate.

14. A television decoder for decoding a signal in which enhancement information for display on an enhanced-definition television (EDTV) system is embedded, the video signal being compatible with a standard receiver which cannot display the enhancement information, the decoder comprising:
  a. a filter bank for dividing the video signal into at least two groups of spatial frequency components including a first group and a second group, the second group containing at least one member in which enhancement information is embedded;
  b. a quantizer for quantizing members of the second group;
  c. a combiner for generating a third group of frequency components from the quantized members and the corresponding non-quantized members of the second group, the third group including members representing the enhancement information; and
  d. a synthesizer for combining members of the first group, quantized members of the second group and members of the third group to generate an EDTV video signal for displaying the enhancement information on the EDTV system.

15. A television decoder as defined in claim 14 wherein the standard receiver is an NTSC receiver.

16. A television decoder as defined in claim 14 wherein the filter bank is a two-dimensional filter bank which operates on the horizontal-vertical spatial frequency spectrum of the video signal and each member of the first and second groups corresponds to a different two-dimensional region within the spatial frequency spectrum.

17. A television decoder as defined in claim 16 wherein the different regions within the spatial frequency spectrum are rectangular blocks and both the two-dimensional filter bank and the synthesizer element are separable filters.

18. A television decoder as defined in claim 14 wherein the filter bank comprises a quadrature-mirror analysis filter bank and the synthesizer element comprises a quadrature-mirror synthesis filter bank.

19. A television decoder as defined in claim 14 wherein the quantizer implements a non-uniform quantization function.

20. A television decoder as defined in claim 14 wherein the quantizer implements a pseudorandom quantization function.

21. A television decoder as defined in claim 14 further comprising an adaptive demodulation element for adaptively demodulating members of the third group before such members are combined by the synthesizer with members of the first group and quantized members of the second group.

22. A television decoder as defined in claim 14 further comprising a descrambler element for unscrambling members of the third group before such members are combined by the synthesizer with members of the first group and quantized members of the second group.

23. A television decoder as defined in claim 14 wherein the combiner employs a reflected code to generate the third group from the quantized members and the corresponding non-quantized members of the second group.

24. A television decoder as defined in claim 14 further comprising a click eliminator for removing impulse noise from the members of the third group before such members are combined by the synthesizer with members of the first group and quantized members of the second group.

25. A television decoder as defined in claim 14 further comprising a channel quality monitor for measuring the quality of the video signal and comparing the measured quality to a preselected threshold, wherein the quality monitor causes the synthesizer to exclude certain members of the third group when combining members of the groups to generate the EDTV signal when certain members would not improve the quality of said EDTV signal.

26. A television system for generating a transmission signal which can be displayed on a standard receiver from a production video signal containing enhancement information which cannot be displayed on the standard receiver, the system comprising:
  a. an encoder for generating a receiver-compatible signal said encoder comprising means for extracting the enhancement information from the production video signal, a quantizer for quantizing lower frequency components of the video signal, the lower frequency components being among the frequency components which are displayed on the standard receiver, and means for embedding the enhancement information into the quantized lower frequency components; and
  b. A modulator for generating the transmission signal from the receiver-compatible video signal;
  wherein the extraction means comprises a filter bank for dividing the video signal into at least two groups of spatial frequency components including a first group and a second group, the first group containing the lower frequency components and the second group containing the enhancement information; and wherein the embedding means comprises a combiner for adding selected members of the second group to corresponding members of the first group to produce a modified first group; and wherein the encoder further comprises a synthesizer for combining the members of the modified first group to generate the receiver-compatible video signal.

27. An enhanced-definition television (EDTV) receiver for decoding a transmission signal in which enhancement information for video display is embedded in quantized lower frequency components of the transmission signal, the transmission signal being compatible with a standard receiver which cannot display the enhancement information, the receiver comprising:
  a. front end circuitry for receiving and demodulating the transmission signal to generate a received signal;
  b. a decoder comprising means for extracting the embedded enhancement information from the lower frequency components of the received signal and means for generating an EDTV video signal including the extracted enhancement information; and
  c. a video display section for displaying the enhancement information in the EDTV video signal,
  wherein the extracting means comprises a filter bank for dividing the received signal into at least two groups of spatial frequency components including a first group and a second group, the second group containing members in which the enhancement information is embedded; a quantizer for quantizing members of the second group; and a combiner for generating a third group of frequency components from the quantized members and the corresponding non-quantized members of the second group, the third group including members containing the enhancement information; and wherein the generating means comprises a synthesizer for combining members of the first group, quantized members of the second group and members of the third group to generate said EDTV video signal for displaying the enhancement information on the EDTV receiver.

28. A method for generating a receiver-compatible signal from a production video signal, the receiver-compatible signal possessing enhancement information for display on an enhanced-definition television (EDTV) system and being compatible with a standard receiver which is not equipped to process the enhancement information, the method comprising:
  a. dividing the video signal into at least two groups of spatial frequency components including a first group and a second group, the first group containing members which when combined together form a standard video signal which is displayed by the standard receiver and the second group containing the enhancement information;
  b. quantizing members of the first group;
  c. adding selected members of the second group to corresponding quantized members of the first group to produce a modified first group; and
  d. combining the members of the modified first group to generate the receiver-compatible video signal.

29. A method for decoding a video signal in which enhancement information for display on an enhanced-definition television (EDTV) system is embedded, the video signal being compatible with a standard receiver which is not equipped to process the enhancement information, the method comprising:
  a. dividing the video signal into at least two groups of spatial frequency components including a first group and a second group, the second group containing members in which the enhancement information is embedded;
  b. quantizing members of the second group;
  c. generating a third group of frequency components by combining the quantized members with the corresponding non-quantized members of the second group, the third group including members containing the enhancement information; and
  d. combining members of the first group, quantized members of the second group and members of the third group to generate an EDTV video signal for displaying the enhancement information on the EDTV system.

* * * * *

UNITED STATES PATENT AND TRADEMARK OFFICE
CERTIFICATE OF CORRECTION

PATENT NO. : 5,010,405
DATED : 04/23/91
INVENTOR(S) : William F. Schreiber et al It is certified that error appears in the above-identified patent and that said Letters Patent is hereby corrected as shown below:

Column 4, line 47, "H." should be --$H_k$--.

Column 5, line 54, "4,907,000" should be --4,907,087--.

Signed and Sealed this

Twentieth Day of April, 1993

Attest:

MICHAEL K. KIRK

*Attesting Officer*   Acting Commissioner of Patents and Trademarks